United States Patent [19]

Enomoto

[11] Patent Number: 5,348,239
[45] Date of Patent: Sep. 20, 1994

[54] PHOTOGRAPHIC FILM CASSETTE

[75] Inventor: Masahiro Enomoto, Kanagawa, Japan

[73] Assignee: Fuji Photo Film Co., Ltd., Kanagawa, Japan

[21] Appl. No.: 79,846

[22] Filed: Jun. 22, 1993

Related U.S. Application Data

[63] Continuation of Ser. No. 735,742, Jul. 25, 1991, abandoned.

[30] Foreign Application Priority Data

Jul. 26, 1990 [JP] Japan .................. 2-198639

[51] Int. Cl.⁵ .............................................. G03B 17/26
[52] U.S. Cl. .................................................. 242/348.4
[58] Field of Search ............... 242/71, 71.1, 71.7, 242/71.8, 71.9; 354/275; 352/72, 75, 78 R

[56] References Cited

U.S. PATENT DOCUMENTS

| | | |
|---|---|---|
| 2,336,278 | 12/1943 | Mihalyi .................. 242/71 |
| 2,360,255 | 10/1944 | Mihalyi .................. 242/71 |
| 2,364,381 | 12/1944 | Mihalyi .................. 242/71 |
| 2,521,935 | 9/1950 | Monroe .................. 242/71 |
| 2,552,200 | 5/1951 | Mihalyi .................. 242/71 |
| 3,467,340 | 9/1969 | Rosenburgh .................. 242/197 |
| 3,556,435 | 1/1971 | Wangerin .................. 242/192 |
| 3,627,229 | 12/1971 | Wangerin .................. 242/192 |
| 3,627,230 | 12/1971 | Wangerin .................. 242/195 |
| 3,677,499 | 7/1972 | Wangerin .................. 242/192 |
| 3,797,777 | 3/1974 | Hosono et al. .................. 242/197 |
| 4,962,401 | 10/1990 | Takahashi .................. 354/275 |
| 5,003,334 | 3/1991 | Pagano et al. .................. 354/275 |
| 5,102,062 | 4/1992 | Bush .................. 242/71.1 |
| 5,181,671 | 1/1993 | Mizuno .................. 242/71.1 |

FOREIGN PATENT DOCUMENTS 2921379 11/1980 Fed. Rep. of Germany .
50-33831 4/1975 Japan .

Primary Examiner—Daniel P. Stodola
Assistant Examiner—John P. Darling
Attorney, Agent, or Firm—Sughrue, Mion, Zinn, Macpeak & Seas

[57] ABSTRACT

A cassette shell consisting of a pair of shell halves, upper and lower, molded from resin. The cassette shell is disassembled to take out the exposed film for development. When the cassette shell is molded, molten resin is injected so as to form a weld line to encircle the circumferential surface of the cassette shell, along which line the cassette shell is broken by spreading a port portion with a jig. In a preferred embodiment, a groove is formed inside the cassette shell and serves for breaking the cassette shell. In another preferred embodiment, receiving recesses are formed on a juncture between the shell halves for receiving a disassembling jig.

23 Claims, 4 Drawing Sheets

PHOTOGRAPHIC FILM CASSETTE

This is a continuation of application Ser. No. 07/735,742 filed Jul. 25, 1991, now abandoned.

BACKGROUND OF THE INVENTION

1. Field of the Invention

The present invention relates to a photographic film cassette. In particular, the present invention is a film cassette having a cassette shell molded from resin.

2. Description of the Prior Art

It is well known to construct a 35 mm photographic film cassette having a cassette shell modeled from resin, as described in Japanese Patent Laid-open Publication Nos. 50-33831 and 57-190948, instead of a conventional metal cassette shell. This type of resin cassette shell is made by joining together two separate shell components each molded by injection molding. The joining of the two shell components is carried out by welding them together by ultrasonic welding or solvent. To develop photographic film, the cassette shell is broken to allow removal of the photographic film from the cassette shell. In order to break the cassette shell, it is well known to cut the juncture by use of an ultrasonic cutter, break the cassette shell by use of a jig, or the like.

However, these conventional cassette breaking methods present problems in the process of developing the film because the surface of the film contained in the cassette might be scratched during the breaking of the cassette shells. This is undesirable because the scratches are visible on the prints resulting from the negatives of the processed film.

SUMMARY OF THE INVENTION

It is therefore an object of the present invention to provide a photographic film cassette having a cassette shell that can easily be broken without damaging the film contained therein.

In order to achieve the above and other objects and advantages of this invention, the photographic film cassette of the subject invention has a spool for winding photographic film thereon in a roll and a light-tight cassette shell for containing the spool rotatably. The cassette shell is molded from resin in a manner so as to have a breaking line of relatively low strength formed on a circumferential wall to encircle a circumferential surface in order to allow low impact breaking of the cassette to take out the film after exposure. A film passageway formed in the cassette shell for advancing the film to an outside of the cassette shell is traversed by the breaking line.

In accordance with a preferred embodiment, a cassette shell includes two shell components molded from resin. At least one receiving recess is formed on a surface of the cassette shell on a juncture joining the two shell components in order to receive a disassembling jig for disassembling the cassette shell along the juncture when removing the film after exposure. The surface of the film can be protected from scratches, because the cassette shell can be broken with relatively low impact.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
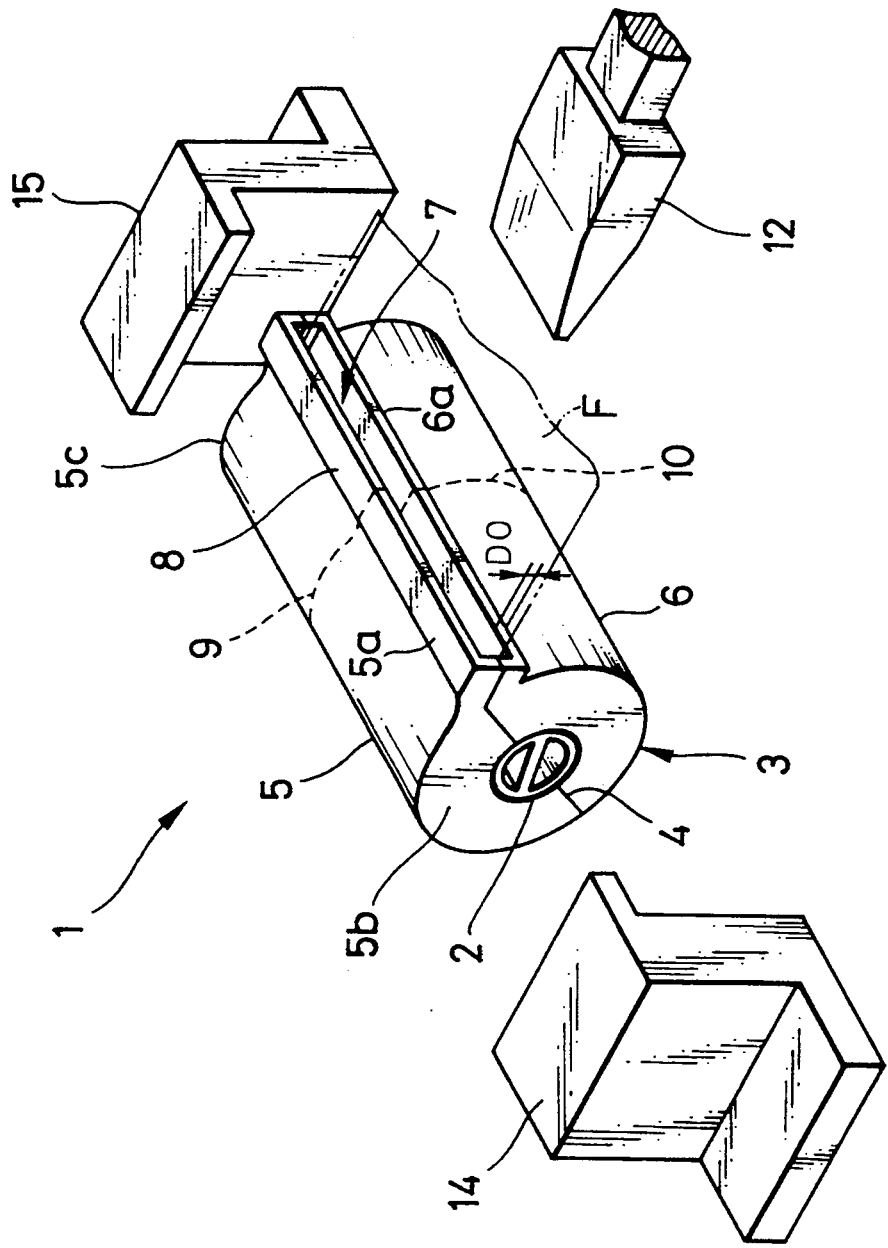
FIG. 1 is a perspective view illustrating a photographic film cassette according to a first preferred embodiment of the present invention.

FIG. 1 illustrates a photographic film cassette 1 according to the first preferred embodiment. Film cassette 1 consists of spool 2 made of resin on which photographic film, e.g. negative film, F is wound in a roll and cassette shell 3 made of resin for containing spool 2 in a rotatable manner. Cassette shell 3 is constituted of upper and lower shell halves 5 and 6 joined together at juncture 4. Shell halves 5 and 6 are attached by means of an adhesive agent, but may be attached by ultrasonic welding, or the like. Shell halves 5 and 6 are provided respectively with tongues 5a and 6a to form port portion 8 with film passageway 7 defined therebetween when shell halves 5 and 6 are joined together.

Shell halves 5 and 6 are molded from resin by injection molding, or the like. Shell half 5 has weld line 9 formed thereon. To mold resin into shell half 5, two gates for injecting molten resin are formed on molds in correspondence with respective positions on or around both lateral walls 5b and 5c. The flows of resin injected through the two gates encounter each other at a substantially middle portion along the widthwise direction of the negative film F to form weld line 9, along which shell half 5 has a low intensity and can be broken with great ease. Shell half 6 has weld line 10 formed by injection molding in a similar manner. The thickness DO of the wall of port portion 8 is determined to be 1.0 to 2.2 mm, preferably 1.8 mm.

A plush or light trapping fabric is actually attached to an inside of port portion 8 for preventing light from entering cassette shell 3 through film passageway 7, but is omitted in the drawings for the purpose of simplification. Reference numerals 14 and 15 designate shell holding jigs for holding cassette shell 3.

To break cassette shell 3 thus constructed, disassembling jig 12 in the shape of a screwdriver is inserted in film passageway 7 and rotated. Port portion 8 and then cassette shell 3 are broken along weld lines 9 and 10. Negative film F can thereby be removed easily without damage. The force required for breaking cassette shell 3 was measured by a torque driver. The obtained values were from 0.8 to 5.0 kgf·cm.

Figure 2:
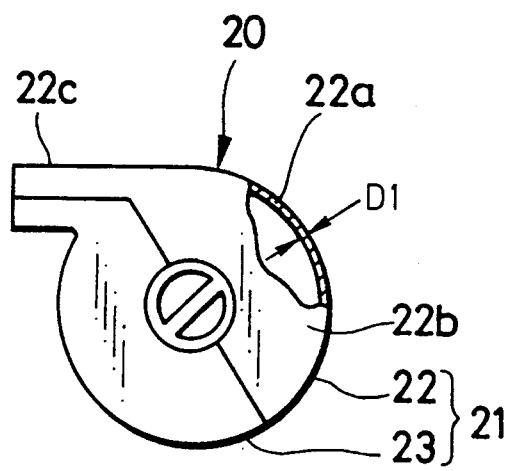
FIG. 2 is a side view, in partial section, illustrating a photographic film cassette according to a second preferred embodiment.
Figure 3:
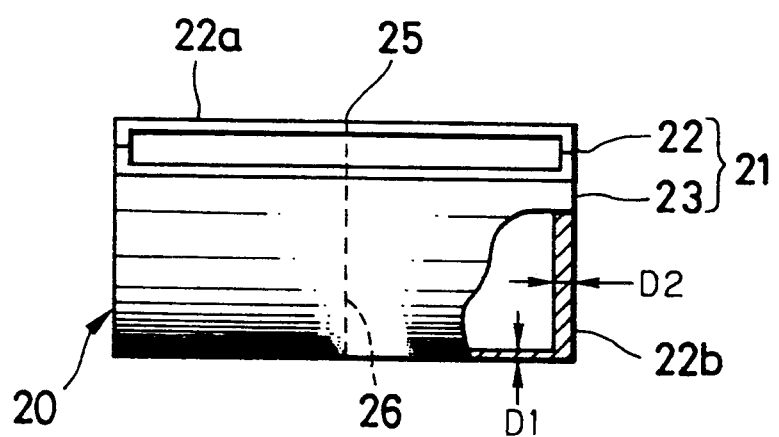
FIG. 3 is a front view, in partial section, illustrating the film cassette illustrated in FIG. 2.

Referring to FIGS. 2 and 3, a second preferred embodiment is now described of which a single gate is used for molding respective upper and lower shell halves 22 and 23 in the same shape as those of the above embodiment. Cassette shell 21 of photographic film cassette 20 consists of shell halves 22 and 23, of which molding of shell half 22 is only described for the purpose of simplification. Shell half 23 is molded in a similar fashion.

Letting D1 be the average thickness of circumferential wall 22a of shell half 22 and D2 be that of lateral walls 22b of the same, the thickness of cassette shell 21 is adjusted to provide that D2/D1 is 1.2 to 2.0, preferably 1.5.

To mold resin into shell half 22, a single gate for injecting molten resin is formed on molds in a position opposite to tongue 22c. The resin is filled in the molding cavity firstly of a portion for the thicker lateral walls 22b, secondly of a portion for the thinner circumferential wall 22a in a slower manner, and finally of a portion for a substantial middle portion of tongue 22c along the widthwise direction of negative film F. A weld line 25 is formed in and near tongue 22c where the resin is lastly filled, and is rather similar to weld line 9 of the first embodiment. Weld line 26 is formed in shell half 23 in the same manner. Naturally, weld lines 25 and 26 are directed to, but do not reach, the positions corresponding to the gates. Cassette shell 21 of this construction can be easily broken by use of breaking jig 12 in the same manner as the first embodiment.

Figure 4:
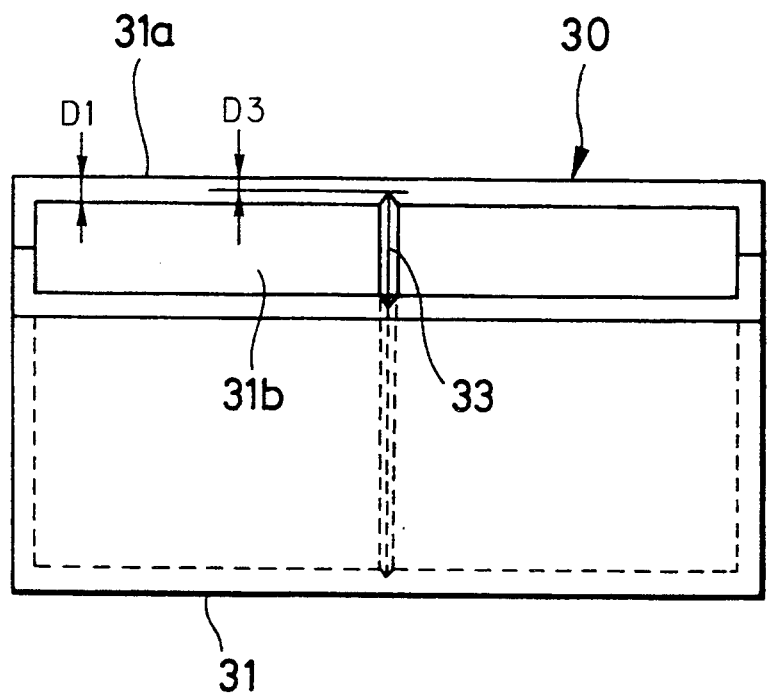
FIG. 4 is a front view in perspective illustrating a photographic film cassette according to a third embodiment, in partial section.

FIG. 4 illustrates the third preferred embodiment. Cassette shell 31 of film cassette 30 is provided with groove 33 having a cross-section formed in the shape of a letter V from the middle of a port portion 31a to the middle of an inside surface 31b of cassette shell 31 in widthwise direction of the negative film F. Letting D3 be a thickness defined between the bottom of groove 33 and the outside surface opposite to groove 33, D3 is determined such that D3/D1 is 0.3 to 0.8, preferably 0.60. Cassette shell 31 of this construction can be easily broken by use of breaking jig 12 in a manner the same as the above embodiments. It is noted that, although ends of groove 33 in port portion 31a are formed to reach the exit of port portion 31a, the ends may be formed to be retracted from the exit of port portion 31a in order to prevent light from entering port portion 31a through the groove 33. Groove 33 may be located in a side portion of cassette shell 31 regarding the widthwise direction of film F.

Figure 5:
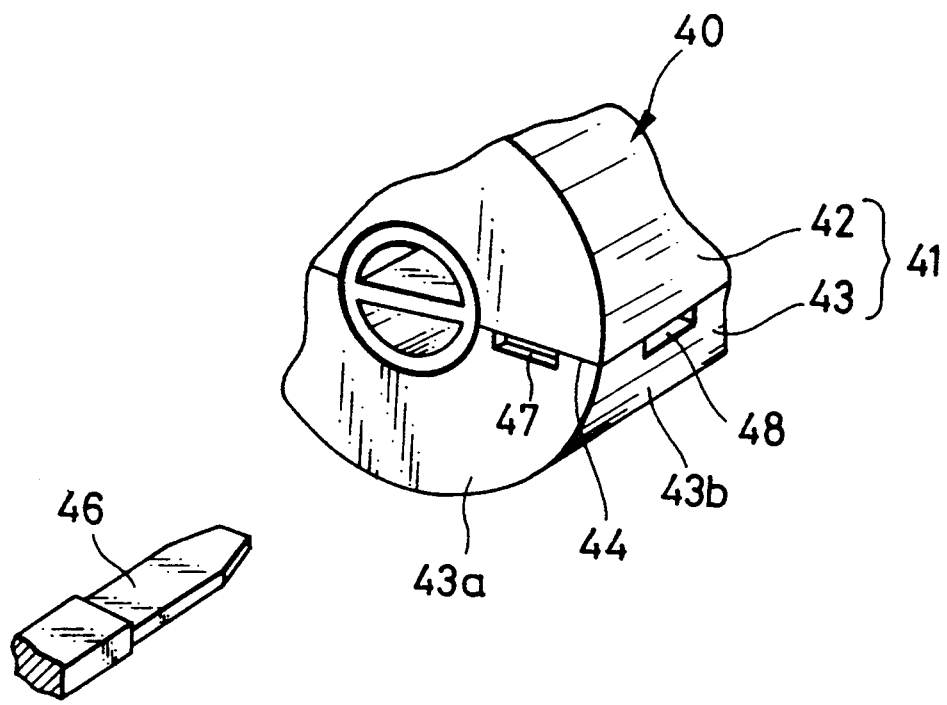
FIG. 5 is a fragmentary view in perspective illustrating a photographic film cassette according to a fourth preferred embodiment.
Figure 6:
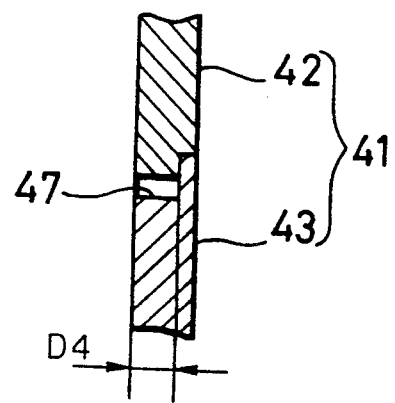
FIG. 6 is a fragmentary view in section illustrating the film cassette illustrated in FIG. 5.

FIG. 5 illustrates a fourth preferred embodiment. Cassette shell 41 of photographic film cassette 40 is provided with receiving recesses 47 and 48 formed in lateral wall 43a and circumferential wall 43b of lower cassette shell 43 along juncture 44 between shell halves 42 and 43 in order to receive a tip of disassembling jig 46. Depth D4 of receiving recesses 47 and 48, as illustrated in FIG. 6, is preferably at least 0.5 mm. Receiving recesses 47 and 48 may be naturally formed on shell half 42.

EXAMPLE

Experiments were conducted regarding the above embodiments and a comparative example to test the ease of breaking cassette shells, scratches placed on the film at the breaking time, and aesthetic appearance of the cassette, of which results were obtained as shown in Table 1. The comparative example is a film cassette having two shell halves of the same material, size and shape as the first preferred embodiment, provided with no weld line, and attached with an adhesive agent.

TABLE 1

|  | Breaking | Film Scratches | Appearance |
| --- | --- | --- | --- |
| 1st embodiment | easy | few | poor |
| 2nd embodiment | easy | few | poor |
| 3rd embodiment | uneasy | few | poor |
| 4th embodiment | uneasy | few | good |
| Comparative Example | difficult | many | good |

As is understood from this table, any of the cassette shells of the film cassette according to the preferred embodiments can be easily broken without scratching the film. The fourth film cassette is advantageous in appearance.

In all of the preferred embodiments, the material for molding the cassette shell is a thermoplastic resin. When polystyrene resin is applied, high-impact polystyrene (HIPS) is included at an amount of 5.0% or more, preferably 30%. This is because the shock strength would be extremely low if the included HIPS were below 5.0%.

Plastic products, after use, account for a large percentage of industrial waste, causing environmental problems. The prevalent disposal of plastic is now under reconsideration. Use of biodegradable plastics has been proposed as well as the recycling of plastics. To minimize waste from used cassette shells of the inventive film cassette herein described, decomposable plastics are desirable. Such materials are currently being developed and already commercially available to some extent. Biodegradable polymer materials are available for use in cassette shells. For example, I.C.I. "BIOPOL", U.C.C. "polycaprolactone", or the like. Polymers exhibiting biodegradation in an indirect manner, through introduction of an additive of natural or synthetic biodegradable polymer, can also be used, e.g. starch-formulated polyethylene.

It is also possible to use polymer material exhibiting photolytic degradation, e.g. ECO copolymer in copolymerization of carbon monoxide with ethylene of which carbonyl group as photo-sensitizing group is introduced to the backbone chain at the time of polymerizing polyethylene. Basic polymer materials with an additive of transition metal salt, oxidation accelerator, photosensitizer or the like added thereto can also be used.

It is noted that the present invention is advantageous for use in a film cassette having a film leader that does not protrude from, but is contained in the cassette shell, so as to be easily loaded in a camera. Rotation of the spool by means of a film feeding mechanism of the camera in the direction of unwinding the film causes the film leader to advance outside of the cassette through a film passageway of the cassette. A cassette shell used for such a film cassette requires leader advancing means consisting, for example, of annular ridges for preventing the film from loosening and a separating claw for separating the film leader from the outermost turns of the film. The cost for manufacturing such a construction is reduced by molding the cassette shell from resin so as to form the leader advancing means integrally with the cassette shell.

Although the present invention has been fully described by way of the preferred embodiments thereof with reference to the accompanying drawings, various changes and modifications may be made without departing from the scope and spirit of the present invention as recited in the appended claims.

What is claimed is:

1. A photographic film cassette comprising:

a spool for winding photographic film thereon in a roll;

a cassette shell being molded from resin and having a circumferential surface, said spool and said film being rotatably contained in said cassette shell in light-tight fashion;

a portion of said cassette shell having a mechanical strength which is lower than other portions of said cassette shell to define a circumferential breaking line so as to allow said cassette shell to be broken along said braking line for the purpose of removing said film from said cassette shell after exposure, said breaking line is a weld line formed substantially on a middle portion of said cassette shell by injecting molten resin from both lateral sides of said cassette shell when molding said cassette shell.

2. A photographic film cassette as claimed in claim 1, wherein a film passageway is formed in said cassette shell for allowing a leading portion of said film to extend to an outside of said cassette shell, said film passageway being traversed by said breaking line.

3. A photographic film cassette as claimed in claim 2, wherein said cassette shell is broken by inserting a disassembling jig in said film passageway so as to spread said film passageway.

4. A photographic film cassette as claimed in claim 3, further comprising:

means for advancing a film leader of said film, through said film passageway, to an outside of said cassette shell by rotating said spool in a direction of unwinding said film.

5. A photographic film cassette as claimed in claim 4, wherein said resin is polystyrene resin including high-impact polystyrene of 5.0% or more.

6. A photographic film cassette as claimed in claim 1, wherein said cassette shell comprises:

two shell halves adhered together with an adhesive agent.

7. A photographic film cassette as claimed in claim 1, wherein said breaking line is a groove formed on an inside surface of said film passageway, substantially at a middle portion in a widthwise direction of said film, said groove extending along an inside surface of said cassette shell so as to allow said cassette shell to be broken along said groove.

8. A photographic film cassette as claimed in claim 7, wherein a cross-section of said groove is in the shape of a letter V.

9. A photographic film cassette comprising:

a spool for winding photographic film thereon in a roll;

a cassette shell being molded from resin and having a circumferential surface, said spool and said film being rotatably contained in said cassette shell in light-tight fashion;

a portion of said cassette shell having a mechanical strength which is lower than other portions of said cassette shell so as to define a circumferential breaking line formed on said circumferential surface to allow said cassette shell to be broken along said breaking line for the purpose of removing said film from said cassette shell after exposure, said breaking line is a weld line formed substantially on a middle portion of said cassette shell at least on an outer surface of said film passageway by injecting molten resin from a position opposite said film passageway with respect to said spool when molding said cassette shell.

10. A photographic film cassette as claimed in claim 9, wherein said cassette shell comprises:

two shell halves adhered together with an adhesive agent.

11. A photographic film cassette as claimed in claim 10, wherein $D1<D2$, where D1 represents a thickness of a circumferential wall of said shell halves and D2 represents a thickness of lateral walls thereof, and said lateral walls are formed faster than said circumferential wall when molding said molten resin.

12. A photographic film cassette as claimed in claim 11, wherein $1.2<D2/D1<2.0$.

13. A photographic film cassette comprising:

a cassette shell molded from resin;

photographic film wound in a roll contained in said cassette shell in light-tight fashion;

a spool rotatably contained in said cassette shell for winding said film thereon;

a film passageway formed in said cassette shell for advancing a leading portion of said film to an outside of said cassette shell; and a groove formed substantially on a middle portion of said cassette shell in widthwise direction of said film, said groove extends along an inside surface of said cassette shell, said cassette shell is capable of being broken along said groove in order to remove said film from said cassette shell after exposure.

14. A photographic film cassette comprising:

a spool for winding photographic film in a roll thereon;

a cassette shell, said spool and said film being rotatably contained in said cassette shell in light tight fashion, said cassette shell including two shell components molded from a resin;

a film passageway formed in said cassette shell for allowing a leading portion of said film to advance to an outside of said cassette shell; and at least one receiving recess, which is separate from said film passageway, formed on a surface of said cassette shell on a juncture joining said two shell components in order to receive a disassembling jig for disassembling said cassette shell along said juncture to allow removal of said film from said cassette shell after exposure.

15. A photographic film cassette as claimed in claim 14, wherein a pair of bearing openings are formed on said cassette shell for supporting the ends of said spool.

16. A photographic film cassette as claimed in claim 15, wherein said shell components are upper and lower shell halves, and said juncture for joining said shell halves passes through said bearing openings and lateral walls of said film passageway.

17. A photographic film cassette as claimed in claim 16, wherein said cassette shell is provided with two receiving recesses formed respectively on a circumferential wall and a lateral wall thereof.

18. A photographic film cassette as claimed in claim 17, further comprising:

means for advancing a film leader of said film to an outside of said cassette shell by rotating said spool in a direction of unwinding said film.

19. A photographic film cassette as claimed in claim 18, wherein said resin is a polystyrene resin including a high-impact polystyrene of 5.0% or more.

20. A photographic film cassette as claimed in claim 19, wherein said shell halves are adhered together with an adhesive agent.

21. A photographic film cassette comprising:

a cassette shell molded from resin;

photographic film wound in a roll contained in said cassette shell in light-tight fashion;

a spool rotatably contained in said cassette shell for winding said film thereon; and a film passageway formed in said cassette shell for advancing a leading portion of said film to an outside of said cassette shell, said film passageway having a circumferential weld line formed substantially on a middle portion thereof in a widthwise direction of said film when molding said cassette shell, said weld line allowing breaking of said cassette shell along a circumferential surface in order to remove said film from said cassette shell after exposure.

22. A photographic film cassette comprising:

a cassette shell molded from resin;

photographic film wound in a roll contained in said cassette shell in light-tight fashion;

a spool rotatably contained in said cassette shell for winding said film thereon;

a film passageway formed in said cassette shell for advancing a leading portion of said film to an outside of said cassette shell; and a groove, which is separate from said film passageway, formed on an inside surface of said cassette shell at portions thereof which define said film passageway, said cassette shell is capable of being broken along said groove in order to remove said film from said cassette shell after exposure.

23. A photographic film cassette as claimed in claim 22, wherein said groove is formed on a side portion of said cassette shell in widthwise direction of said film.

* * * * *